(12) United States Patent
Tang et al.

(10) Patent No.: US 10,358,806 B2
(45) Date of Patent: Jul. 23, 2019

(54) TOILET WITH VOICE COMMAND UNIT

(71) Applicants: Yi-Wen Tang, Taichung (TW); Jui-Chi Tang, Taichung (TW)

(72) Inventors: Yi-Wen Tang, Taichung (TW); Jui-Chi Tang, Taichung (TW)

( * ) Notice: Subject to any disclaimer, the term of this patent is extended or adjusted under 35 U.S.C. 154(b) by 0 days.

(21) Appl. No.: 15/821,853

(22) Filed: Nov. 24, 2017

(65) Prior Publication Data

US 2019/0161948 A1    May 30, 2019

(51) Int. Cl.
*E03D 1/36* (2006.01)
*E03D 5/10* (2006.01)
*G10L 15/22* (2006.01)

(52) U.S. Cl.
CPC .............. *E03D 5/105* (2013.01); *E03D 1/36* (2013.01); *G10L 15/22* (2013.01); *G10L 2015/223* (2013.01)

(58) Field of Classification Search
CPC ........... E03D 5/105; E03D 1/36; G10L 15/22; G10L 2015/223

USPC ............................................................ 4/313
See application file for complete search history.

(56) References Cited

U.S. PATENT DOCUMENTS 9,714,506 B1 *   7/2017  Tang ...................... E03D 5/10
                                                      4/313
2008/0028507 A1 *  2/2008  Ozenick ................ E03D 5/105
                                                      4/313

* cited by examiner

*Primary Examiner* — Tuan N Nguyen

(57) ABSTRACT

A toilet with voice command unit includes a base, a piping unit and a control unit. The base includes a first space and a second space. The piping unit is located in the first space and includes an inlet pipe, at least one outlet pipe and at least one electro-magnetic valve. When the at least one electro-magnetic valve is activated, the at least one outlet pipe is opened to flush the toilet. The control unit includes a voice command processing unit which receives at least one voice command from the user, and verifies the at least one voice command, and generates at least one voice command signal to activate the at least one electro-magnetic valve so that the at least one outlet pipe is opened to flush.

12 Claims, 7 Drawing Sheets

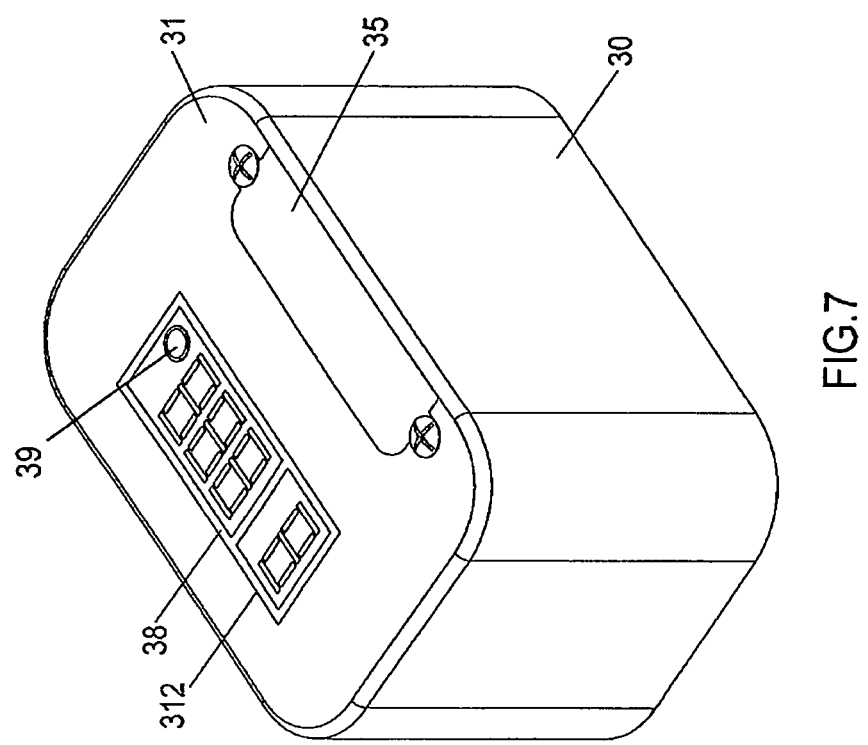

TOILET WITH VOICE COMMAND UNIT

BACKGROUND OF THE INVENTION

1. Fields of the Invention

The present invention relates to a toilet with voice command unit, and more particularly, to a toilet that is controlled by voice commands to flush.

2. Descriptions of Related Art

The conventional toilet known to applicant is disclosed in U.S. Pat. No. 9,714,506 and comprises a body having a space defined therein. The body includes a first room and a second room, wherein the first room communicating with a first opening. The second room communicates with the first room and has a first flushing outlet which communicates with the second room. The second room is a curved pipe. The first flushing outlet is located close to a connection area between the first and second rooms. The first flushing outlet is used to flush the second room. The first room has a second flushing outlet which communicates with the first room. The second flushing outlet is located close to the first opening and is used to flush the first room. A control unit is connected to the body and has a communication pipe, a first electro-magnetic valve, a second electro-magnetic valve and a water-supply pipe. The communication pipe is located in the space and is a three-way pipe. The communication pipe has a first tube, a second tube and a third tube. The first tube, the second tube and the third tube communicate with each other. The first electro-magnetic valve is connected between the first tube of the communication pipe and a first water pipe. The second electro-magnetic valve is connected between the second tube of the communication pipe and a second water pipe. The water-supply pipe communicates with the third tube of the communication pipe. The control unit is connected with a tap water pipe by the water-supply pipe so that tap water flows to the communication pipe, the first electro-magnetic valve and the second electro-magnetic valve. A second pipe is located in the body and is connected with the second flushing outlet and the second water pipe of the second electro-magnetic valve. The second electro-magnetic valve controls the tap water to flow from the second electro-magnetic valve to the second pipe and the second flushing outlet to flush the first room. A first pipe unit is located in the body and connected with the first flushing outlet and the first water pipe of the first electro-magnetic valve. The first pipe unit has a first pipe and a first one-way valve. The first pipe is connected between the first flushing outlet and the first water pipe of the first electro-magnetic valve. The first one-way valve is connected to one end of the first pipe and seals the first flushing outlet so that the tap water flows from the first pipe to the first flushing outlet and cannot flows back to the first pipe. A controller is located in the space of the body and is electrically connected to the first and second electro-magnetic valves. The controller controls operation time of the first and second electro-magnetic valves.

It is noted that the toilet requires the uses to operate the fist button or the second button of the controller to activate the first and second electro-magnetic valves so as to flush the first room and second room. The first and second buttons are attached with a lot of germs, especially for those toilets for public use, and this becomes a serious health concern. Besides, for some disable users, the first and second buttons may not be conveniently accessed.

The present invention intends to provide a toilet that is able to be operated by voice commands.

SUMMARY OF THE INVENTION

The present invention relates to a toilet and comprises a base, a piping unit and a control unit. The base includes a first space and a second space. The piping unit is located in the first space and includes an inlet pipe, at least one outlet pipe and at least one electro-magnetic valve. When the at least one electro-magnetic valve is activated, the at least one outlet pipe is opened to flush the toilet. The control unit includes a voice command processing unit which receives at least one voice command from the user, and verifies the at least one voice command, and generates at least one voice command signal to activate the at least one electro-magnetic valve so that the at least one outlet pipe is opened to flush.

The present invention will become more apparent from the following description when taken in connection with the accompanying drawings which show, for purposes of illustration only, a preferred embodiment in accordance with the present invention.

BRIEF DESCRIPTION OF THE DRAWINGS

FIG. 7 is a perspective view of the control unit of the third embodiment of the toilet of the present invention.

DETAILED DESCRIPTION OF THE PREFERRED EMBODIMENT

Figure 1:
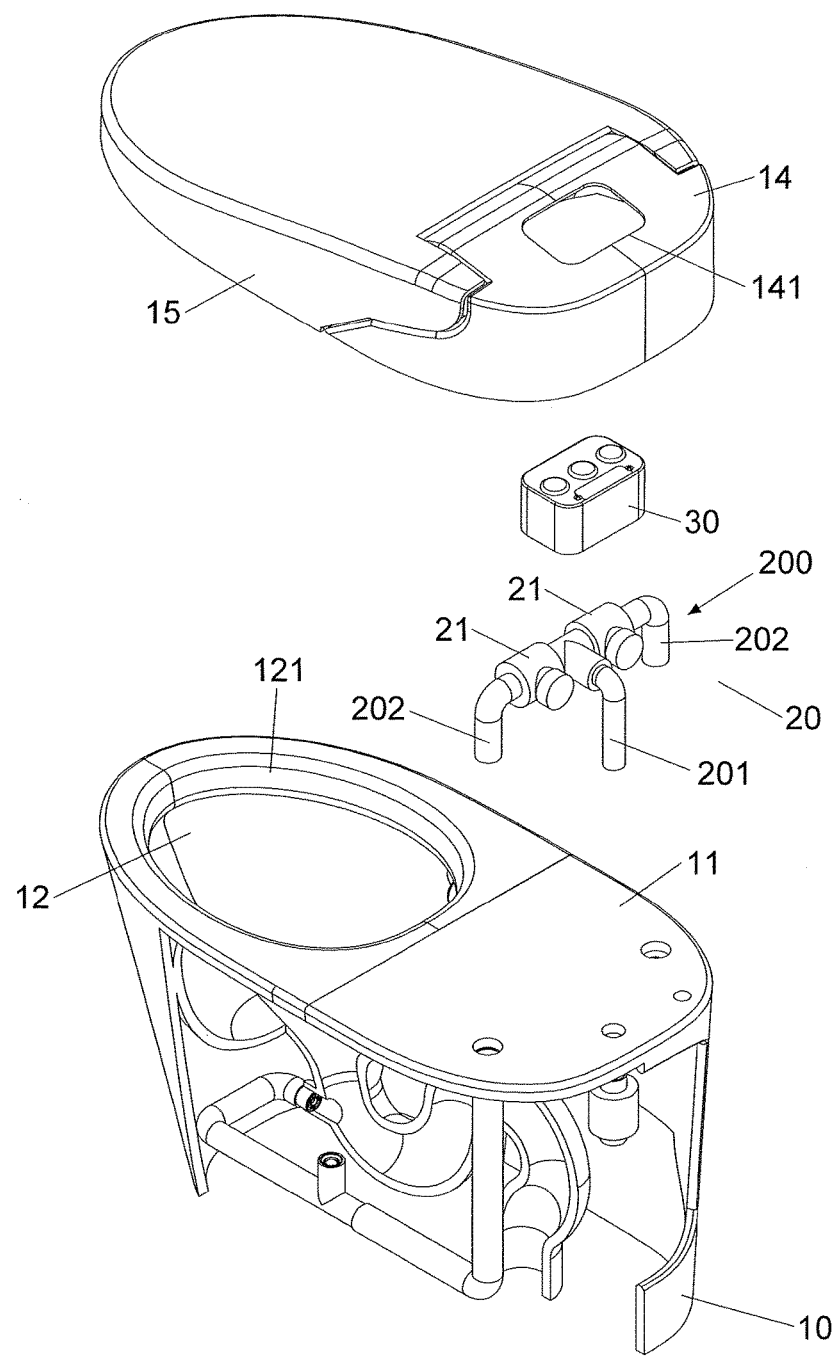
FIG. 1 is an exploded view of the toilet of the present invention.
Figure 2:
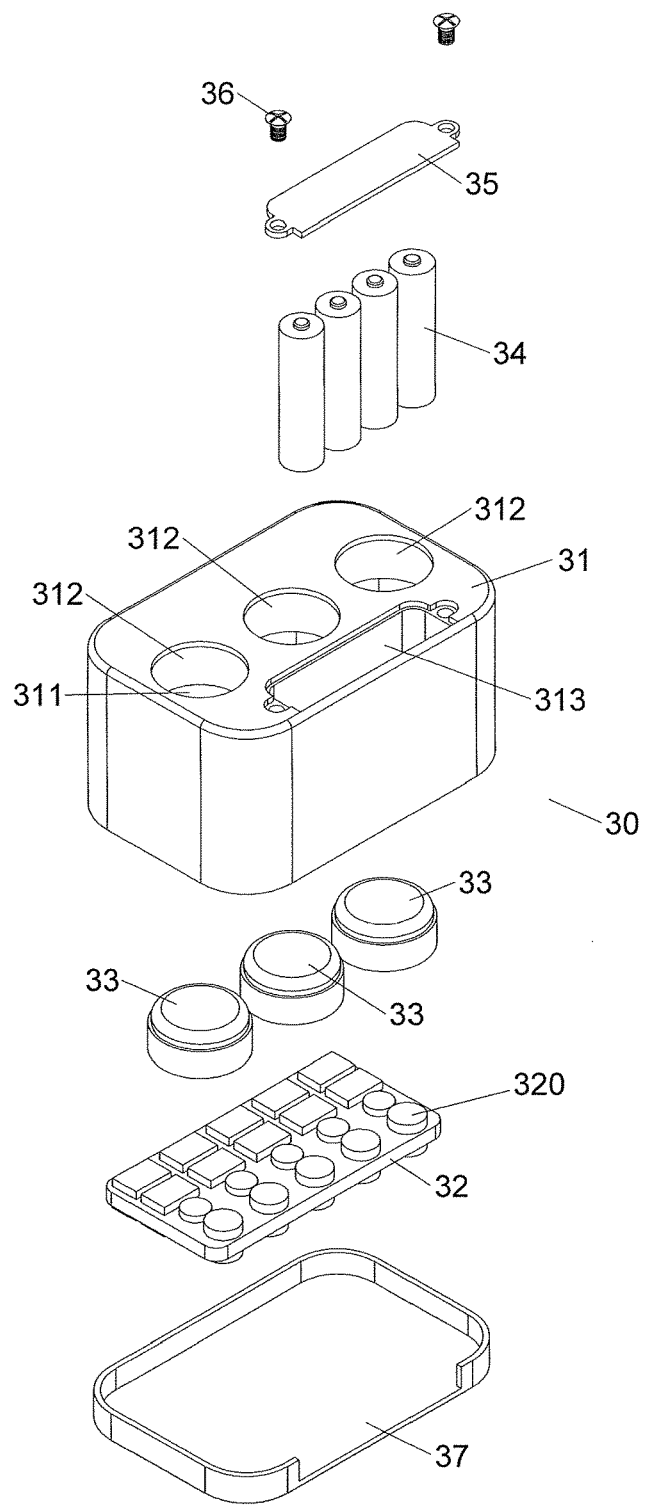
FIG. 2 is an exploded view of the control unit of the toilet of the present invention.
Figure 3:
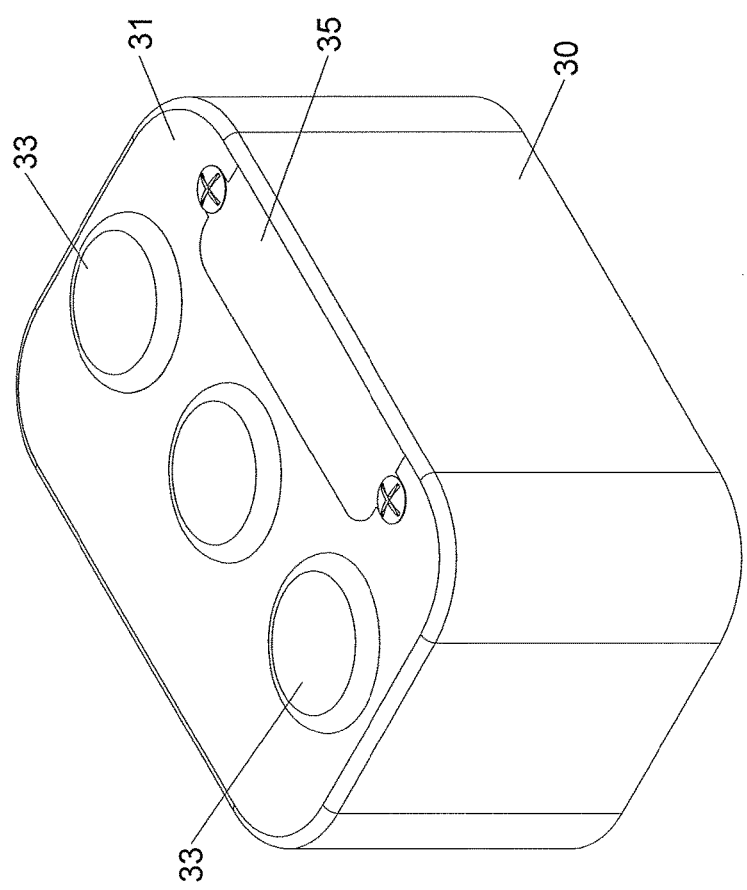
FIG. 3 is a perspective view of the control unit of the toilet of the present invention.
Figure 4:
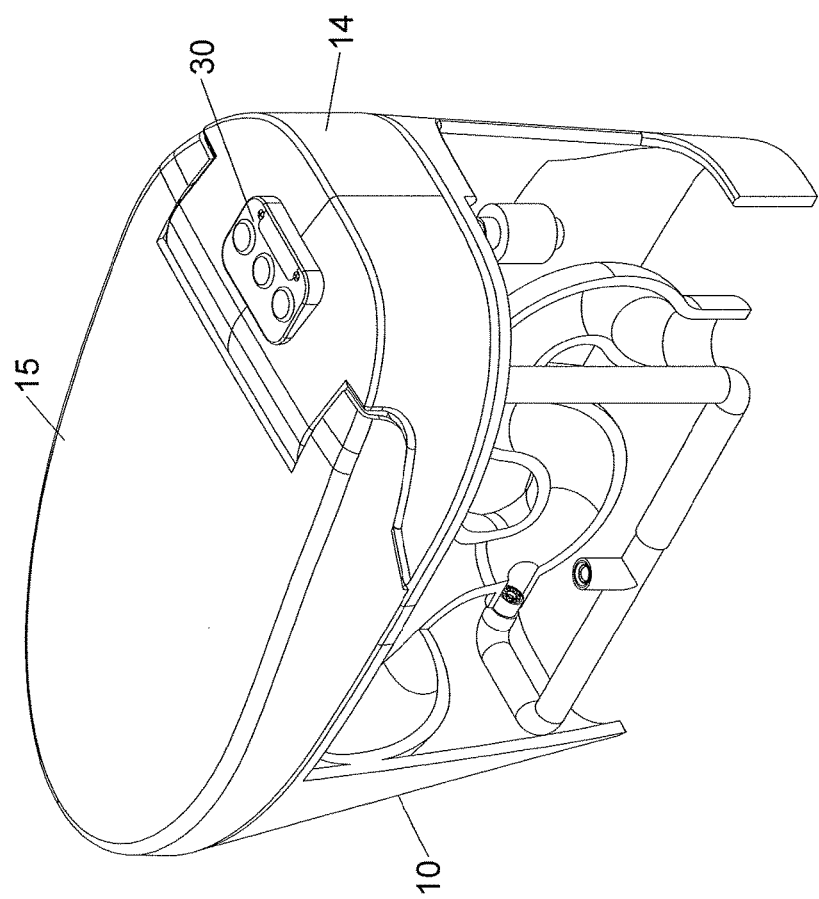
FIG. 4 is a perspective view of the toilet of the present invention.

Referring to FIGS. 1 to 4, the toilet of the present invention comprises a base 10 which has a first space 11 and a second space 12. A lid seat 14 is connected to the first space 11 and has a through hole 141 defined centrally therethrough. A lid 15 is pivotably connected to the lid seat 14 for covering a first opening 121 of the second space 12.

A piping unit 20 is located in the first space 11 and comprises an inlet pipe 201 and two outlet pipes 202 which are connected to the inlet pipe 201 to form a three-way pipe 200. Two electro-magnetic valves 21 are respectively connected to the two outlet pipes 202. One end of the inlet pipe 201 is connected with a water source which introduces water through the two outlet pipes 202. The two electro-magnetic valves 21 are activated or shut off to respectively control open-status or close-status of the outlet pipes 202.

A control unit 30 is located in the through hole 141 and controls the electro-magnetic valves 21 to be activated. The control unit 30 communicates with the two electro-magnetic valves 21 by cables or by wireless way. The control unit 30 comprises a box 31, a voice command processing unit 32, multiple buttons 33, multiple batteries 34, a cover 35, two fastening members 36 and a base plate 37. The box 31 includes a first room 311 an a third room 313 which communicates with the first room 311. Three second rooms 312 are located at the upper portion of the box 31 and communicate with the first room 311. Each second room 312 includes a circular top opening. The voice command processing unit 32 is located in the first room 311 and communicates signally with the electro-magnetic valves 21 by cables or by wireless way. The voice command processing unit 32 receives at least one voice command by a voice frequency receiving unit 320 (such as a microphone) and verifies the at least one voice command, and then generates at least one voice command signal corresponding to the at least one voice command to activate the electro-magnetic valves 21. Water flows through the outlet pipes 202 and the second space 12 to flush. The voice frequency receiving unit 320 can be equipped to locate on an upper portion of the box 31 so as to receiving the at least one voice command easily.

When the voice command processing unit 32 receives the at least one voice command as a first voice command, and first voice command is verified, a first voice command signal is generated which is transferred from the first voice command. The first voice command signal activates the two electro-magnetic valves 21 simultaneously for a first period of time, or the first voice command signal activates one of the two electro-magnetic valves 21 for a second period of time, the second period of time is longer than the first period of time. When the voice command processing unit 32 receives the at least one voice command as a second voice command and the second voice command is verified, a second voice command signal is generated which is transferred from the second voice command, the second voice command signal activates one of the electro-magnetic valves 21 for a certain period of time. The first voice command is in a form of at least one voice of "major", "one" and "the first". The second voice command is in a form of at least one voice of "minor", "two" and "the second".

The three buttons 33 are respectively located in the three second rooms 312, and the three buttons 33 partially protrude for being pressed by the users. Two buttons 33 respectively control the two electro-magnetic valves 21 to be activated, and the third button 33 is a manual button which can be pressed during in power outrage to activate the electro-magnetic valves 21 to flush.

The batteries 34 are located in the third room 313 to provide electric power to the voice command processing unit 32 and the electro-magnetic valves 21. The cover 35 is mounted to the top opening of the third room 313. A seal ring is located between the cover 35 and the top opening of the third room 313 so that the batteries 34 are restricted in the third room 313.

The two fastening members 36 respectively extend through two ends of the cover 35 and are connected to the box 31 to fix the cover 35 to top opening of the third room 313. The bottom plate 37 is shaped to match the shape of the underside of the box 31 so as to receive the voice command processing unit 32, the buttons 33 and the at least one battery 34 in the box 31.

Figure 5:
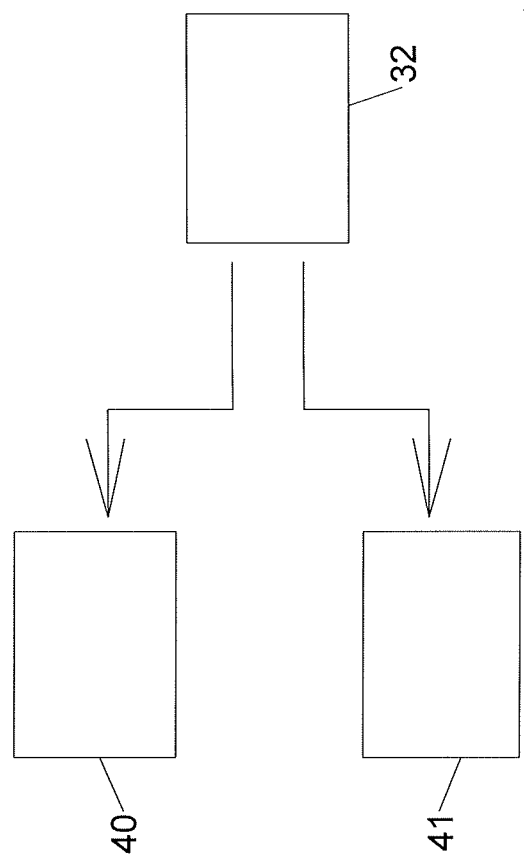
FIG. 5 illustrates the connection between the voice command processing unit, the computer and phone application.

As shown in FIG. 5, the voice command processing unit 32 receives a command from a computer 40 or a phone application 41 to activate the electro-magnetic valves 21. A recorded data of the electro-magnetic valves 21 is sent to the computer 40 or the phone application 41. The recorded data may include the number of flushes, the number of the major and minor flushes, and/or the sum of flushes for a period of time.

Figure 6:
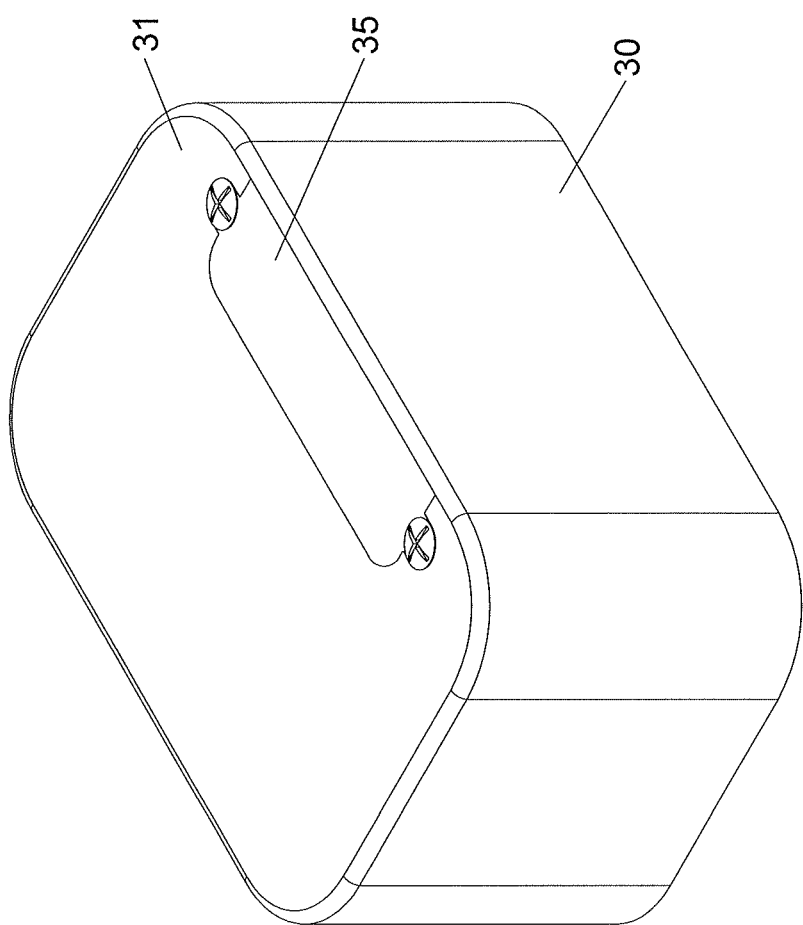
FIG. 6 is a perspective view of the control unit of the second embodiment of the toilet of the present invention.

FIG. 6 shows that the control unit 30 includes multiple buttons 33. That is to say, the box 31 does not have the second rooms 312. The control unit 30 controls the operation of the electro-magnetic valves 21 by the voice command processing unit 32.

FIG. 7 shows that the control unit 30 includes multiple buttons 33. The second room 312 is a rectangular room and includes a display panel 38 engaged with the rectangular room. The display panel displays the status of communication between the voice command processing unit 32 and the electro-magnetic valves 21, or displays time and the number of activation of the electro-magnetic valves 21.

Yet another embodiment of the present invention is that the control unit 30 does not have the batteries 34 and the third rom 313. Instead, a power supply pack is used to receive electric energy from a power source by wireless way so as to provide electric power to the control unit 30. The power supply pack is integral with the voice command processing unit 32.

Referring to FIG. 7, another embodiment of the present invention is that the base 10 has at least one electronic device 39 which equipped on the box 31 of the control unit 30. When the voice command processing unit 32 receives a third voice command and the third voice command is verified, a third voice command signal is generated which is transferred from the third voice command, the third voice command signal controls the electronic device to activate.

The advantages of the present invention are that the voice command processing unit 32 receives the users' voice commands to control the toilet to flush such that the users do not need to touch any parts with germs attached thereon, and the disable users can easily operate the toilet.

The users can flush the toilet by the voice commands or by pressing any of the buttons 33 to control the electro-magnetic valves 21 to flush. That is to say, there are two ways of the control unit 30 to control the electro-magnetic valves 21 to flush.

As shown in FIG. 5, the voice command processing unit 32 receives a command from a computer 40 or a phone application 41 to activate the electro-magnetic valves 21. A recorded data of the electro-magnetic valves 21 is sent to the computer 40 or the phone application 41. The recorded data may include the number of flushes, the number of the major and minor flushes, and/or the sum of flushes for a period of time. The recorded data can be a valuable reference to the users.

While we have shown and described the embodiment in accordance with the present invention, it should be clear to those skilled in the art that further embodiments may be made without departing from the scope of the present invention.

What is claimed is:

1. A toilet with voice command unit comprising:
   a base having a first space and a second space;
   a lid seat being connected to the first space and having a through hole defined therethrough;
   a lid being pivotably connected to the lid seat for covering a first opening of the second space;
   a piping unit being located in the first space and comprising an inlet pipe, two outlet pipes and two electro-magnetic valves connected to the two outlet pipes correspondingly, the two outlet pipes and the inlet pipe forming a three-way pipe, one end of the inlet pipe being adapted to be connected with a water source, the two electro-magnetic valves being activated or shut off to respectively control open-status or close-status of the two outlet pipes, and
   a control unit being located in the through hole and controlling the two electro-magnetic valves to be activated, wherein the control unit comprising a box, a voice command processing unit, at least one battery and a cover; the box having a first room and a third room which communicates with the first room, the voice command processing unit being located in the first room; wherein when the voice command processing unit receives and verifies a first voice command, a first voice command signal is generated which is transferred from the first voice command, the first voice command signal simultaneously activates the two electro-magnetic valves so that the two outlet pipes are simultaneously in open-statuses for a first period of time; wherein when the voice command processing unit receives and verifies a second voice command, a second voice command signal is generated which is transferred from the second voice command, the second voice command signal activates one of the two electro-magnetic valves so that one of the two outlet pipes is in open-status for a second period of time, wherein the length of the second period of time is the same as the length of the first period of time; the at least one battery being located in the third room to provide electric power to the voice command processing unit and the two electro-magnetic valves, the cover being mounted to a top opening of the third room to seal the at least one battery in the third room, a seal ring being located between the cover and the top opening of the third room.

2. The toilet as claimed in claim 1, wherein the voice command processing unit receives the first and second voice commands by a voice frequency receiving unit, the voice frequency receiving unit locates on an upper portion of the box.

3. The toilet as claimed in claim 1, wherein the voice command processing unit receives the first and second voice command signals from a computer to activate the two electro-magnetic valves, a recorded data of time of activation of the two electro-magnetic valves is sent to the computer.

4. The toilet as claimed in claim 1, wherein the voice command processing unit receives the first and second voice command signals from a phone application to activate the two electro-magnetic valves, a recorded data of time of activation of the two electro-magnetic valves is sent to the phone application.

5. The toilet as claimed in claim 1, wherein the box has a rectangular room for engaging with a display panel, the display panel displays a status of communication between the voice command processing unit and the two electro-magnetic valves, or displays time of activation of the two electro-magnetic valves.

6. The toilet as claimed in claim 1, wherein a power supply pack receives electric power from a power source by wireless way so as to provide electric power to the control unit, the power supply pack is mounted on the voice command processing unit.

7. The toilet as claimed in claim 1, wherein the base has at least one electronic device which equipped on the box of the control unit, when the voice command processing unit receives and verifies a third voice command, a third voice command signal is generated which is transferred from the third voice command, the third voice command signal controls the at least one electronic device to activate.

8. The toilet as claimed in claim 1, wherein an upper portion of the box is defined three second rooms thereon communicating with the first room, there are three buttons respectively connected to the three second rooms, one of the three buttons activates the two electro-magnetic valves simultaneously so that the two outlet pipes are simultaneously in open-statuses for a third period of time, another one of the three buttons activates one of the two electro-magnetic valves so that one of the two outlet pipes is in open-status for a fourth period of time, and the other one of the three buttons manually activates the two electro-magnetic valves so that the two outlet pipes are in open-statuses.

9. The toilet as claimed in claim 1, wherein a bottom plate is shaped to match a shape of an underside of the box, the bottom plate seals the underside of the box to receive the voice command processing unit and the at least one battery in the box.

10. A toilet with voice command unit comprising:
a base having a first space and a second space;
a lid seat being connected to the first space and having a through hole defined therethrough;
a lid pivotably being connected to the lid seat for covering a first opening of the second space;
a piping unit being located in the first space and comprising an inlet pipe, two outlet pipes and two electro-magnetic valves connected to the two outlet pipes, the two outlet pipes and the inlet pipe forming a three-way pipe, one end of the inlet pipe being adapted to be connected with a water source, the two electro-magnetic valves being activated or shut off to respectively control open-status or close-status of the two outlet pipes, and
a control unit being located in the through hole and controlling the two electro-magnetic valves to be activated, wherein the control unit comprising a box, a voice command processing unit, at least one battery and a cover; the box having a first room and a third room which communicates with the first room, the voice command processing unit being located in the first room; wherein when the voice command processing unit receives and verifies a first voice command, a first voice command signal is generated which is transferred from the first voice command, the first voice command signal simultaneously activates the two electro-magnetic valves so that the two outlet pipes are simultaneously in open-statuses for a first period of time; wherein when the voice command processing unit receives and verifies a second voice command, a second voice command signal is generated which is transferred from the second voice command, the second voice command signal simultaneously activates the two electro-magnetic valves so that the two outlet pipes are simultaneously in open-statuses for a second period of time, wherein the length of the second period of time is different from the length of the first period of time; the at least one battery being located in the third room to provide electric power to the voice command processing unit and the two electro-magnetic valves, the cover being mounted to a top opening of the third room to seal the at least one battery in the third room, a seal ring being located between the cover and the top opening of the third room.

11. The toilet as claimed in claim 10, wherein the voice command processing unit receives the first and second voice commands by a voice frequency receiving unit, the voice frequency receiving unit locates on an upper portion of the box of the control unit which is located in the through hole of the lid seat.

12. The toilet as claimed in claim 10, wherein the box has a rectangular room, the rectangular room engages with a display panel, the display panel displays a status of communication between the voice command processing unit and the two electro-magnetic valves, or displays time of activation of the two electro-magnetic valves.

* * * * *